(12) United States Patent
Mueller et al.

(10) Patent No.: US 9,976,549 B2
(45) Date of Patent: May 22, 2018

(54) METHOD AND DEVICE FOR CONTROLLING A TORQUE OF AN ELECTRIC MOTOR OF AN ELECTRO-HYDRAULIC SYSTEM

(75) Inventors: Karsten Mueller, Marktheidenfeld (DE); Volker Schueren, Marktheidenfeld (DE); Dieter Holl, Lohr (DE); Bernd Spatz, Waldaschaff (DE); Dirk-Walter Herold, Urspringen (DE); Wolfgang Haug, Reutlingen (DE); Eberhard Schemm, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 701 days.

(21) Appl. No.: 14/126,526

(22) PCT Filed: May 11, 2012

(86) PCT No.: PCT/EP2012/002022
§ 371 (c)(1),
(2), (4) Date: Apr. 14, 2014

(87) PCT Pub. No.: WO2012/171603
PCT Pub. Date: Dec. 20, 2012

(65) Prior Publication Data
US 2014/0219822 A1     Aug. 7, 2014

(30) Foreign Application Priority Data
Jun. 16, 2011 (DE) .......................... 10 2011 104 292

(51) Int. Cl.
*F04B 49/20* (2006.01)
*F15B 11/00* (2006.01)
(Continued)

(52) U.S. Cl.
CPC ............. *F04B 49/20* (2013.01); *F15B 11/00* (2013.01); *H02P 6/08* (2013.01); *H02P 23/20* (2016.02); *H02P 25/024* (2016.02); *F15B 2211/20515* (2013.01); *F15B 2211/275* (2013.01); *F15B 2211/6309* (2013.01)

(58) Field of Classification Search
CPC ............ F04B 49/002; F04B 2203/0207; F04C 2270/03; F04C 2270/035
See application file for complete search history.

(56) References Cited

U.S. PATENT DOCUMENTS

| 4,826,640 A | 5/1989 | Neko |
| 5,281,774 A | 1/1994 | Masaki |
| (Continued) | | |

OTHER PUBLICATIONS

International Search Report corresponding to PCT Application No. PCT/EP2012/002022, dated Jul. 16, 2013 (German and English language document) (5 pages).

*Primary Examiner* — Patrick Hamo
(74) *Attorney, Agent, or Firm* — Maginot, Moore & Beck LLP

(57) ABSTRACT

A method is used to control a torque of an electric motor of an electro-hydraulic system. The method includes selecting a value of a set point torque depending on a current pressure in a hydraulic circuit of the electro-hydraulic system. The method also includes determining a control signal for controlling the torque of the electric motor using a target torque and the set point torque.

14 Claims, 3 Drawing Sheets

(51) Int. Cl.
*H02P 6/08* (2016.01)
*H02P 23/20* (2016.01)
*H02P 25/024* (2016.01)

(56) References Cited

U.S. PATENT DOCUMENTS 5,951,258 A * 9/1999 Lueschow ............. F04B 49/065
   417/22
6,536,402 B2 * 3/2003 Houchin ............. F02D 41/1497
   123/198 D

* cited by examiner

METHOD AND DEVICE FOR CONTROLLING A TORQUE OF AN ELECTRIC MOTOR OF AN ELECTRO-HYDRAULIC SYSTEM

This application is a 35 U.S.C. § 371 National Stage Application of PCT/EP2012/002022, filed on May 11, 2012, which claims the benefit of priority to Serial No. DE 10 2011 104 292.3, filed on Jun. 16, 2011 in Germany, the disclosures of which are incorporated herein by reference in their entirety.

BACKGROUND

The present disclosure relates to a method for controlling a torque of an electric motor of an electro-hydraulic system and to a corresponding device, in particular for a vehicle.

In electro-hydraulic systems, pressure-limiting valves are frequently used for protecting components of the system against excess pressures. This also applies to systems which have variable rotational speed drives with closed-loop/open-loop control of the pressure/mass flow (p/Q closed-loop/open-loop control).

SUMMARY

The object of the present disclosure is to provide an improved method for controlling a torque of an electric motor of an electro-hydraulic system and an improved device for controlling a torque of an electric motor of an electro-hydraulic system.

This object is achieved by means of a method and a device according to the description below. Advantageous refinements can be found in the following description.

The present disclosure relates to a method for controlling a torque of an electric motor of an electro-hydraulic system, wherein the method comprises the following steps:
  selecting a value of a target torque as a function of a current pressure in a hydraulic circuit of the electro-hydraulic system; and
  determining an actuation signal for controlling the torque of the electric motor on the basis of a setpoint torque and the target torque.

The electro-hydraulic system can have hydraulic lines which form a hydraulic circuit. Components which are supplied with pressure via the hydraulic circuit, to be more precise by means of a fluid conducted in the hydraulic circuit, can be connected to the hydraulic circuit. The electro-hydraulic system can also have a pump which is connected into the hydraulic circuit, for example a variable pump. The pump is configured to move the fluid in the hydraulic circuit. The pump of the electro-hydraulic system can be driven by means of the electric motor. The electric motor can be a synchronous motor for example. The electric motor may have a variable torque, a variable rotational speed or the like. The electric motor can be controlled by a control device, a control unit, a controller or the like. The above-mentioned method can be carried out in conjunction with the control device. The current pressure in the hydraulic circuit can be detected by means of a pressure-detection apparatus, a pressure sensor or the like. A signal representing the current pressure can be received by the control device. The target torque can represent a limitation for the setpoint torque of the electric motor. The value of the target torque can be selected as a function of the current pressure in the hydraulic circuit in such a way that the actuation signal for the electric motor is determined from the setpoint torque and the pressure-dependent target torque. The actuation signal for the electric motor can represent a limiting torque or limited torque which is obtained from a combination of the setpoint torque and the target torque.

The present disclosure also relates to a device for controlling a torque of an electric motor of an electro-hydraulic system, wherein the device comprises the following features:
  an apparatus for selecting a value of a target torque as a function of a current pressure in a hydraulic circuit of the electro-hydraulic system; and
  an apparatus for determining an actuation signal for controlling the torque of the electric motor on the basis of a setpoint torque and the target torque.

The above-mentioned method can be advantageously carried out in conjunction with the device. The present disclosure therefore provides a device which is configured to carry out or implement the steps of the above-mentioned method. In particular, the device can have apparatuses which are configured to carry out one step of the method each. The object on which the disclosure is based can also be advantageously carried out by this embodiment variant of the disclosure in the form of a device. A device can be understood here to be an electrical apparatus which can control a torque of an electric motor of an electro-hydraulic system. The device can therefore be a control device, a controller or the like. The device can have an interface which can be embodied by means of hardware and/or software. In the case of a hardware embodiment, the interfaces may be, for example, part of a so-called ASIC system, which contains a wide variety of functions of the device. However, it is also possible for the interfaces to be composed of separate integrated circuits or at least partially of discrete components. In the case of a software embodiment, the interfaces can be software modules which are present, for example, on a microcontroller together with other software modules.

A computer program product with program code for carrying out the above-mentioned method when the program is run on the above-mentioned device is also advantageous.

The present disclosure is based on the realization that an actuation signal for an electric motor of an electro-hydraulic system can be determined on the basis of a target torque which is dependent on a current pressure in a hydraulic circuit of the electro-hydraulic system. The target torque can limit, for example, the torque generated by the actuation signal at the electric motor, as a function of the current pressure. It is possible, for example, to implement pressure limitation for the electro-hydraulic system by a torque-limiting means or motor current-limiting means by means of the actuation signal for the electric motor.

By limiting the motor current for the electric motor, brought about by means of the actuation signal or the target torque, it is possible to advantageously dispense with a pressure-limiting valve in the electro-hydraulic system. This permits costs to be reduced and the electro-hydraulic system to be simplified. Eliminating the pressure-limiting valve simplifies the hydraulic circuit and reduces costs. Replacing the pressure-limiting valve by a torque-controlled motor current-limiting means reduces costs and complexity, since additional expenditure for a pressure-limiting valve is avoided.

In the selecting step it is possible for the value of the target torque to be selected as a function of a predefined maximum pressure in the hydraulic circuit of the electro-hydraulic system and the current pressure in the hydraulic circuit of the electro-hydraulic system. The predefined maximum pressure can be, for example, a pressure-limiting response pressure, a critical pressure, a maximum permissible pressure, a safety pressure or the like in the hydraulic circuit. The predefined maximum pressure in the hydraulic circuit can serve here as a limiting value for the selecting step. The selecting step can be carried out here on the basis of a combination of the predefined maximum pressure and the current pressure in the hydraulic circuit of the electro-hydraulic system. In this context, in the selecting step it is possible to select a value of the target torque as a function of a ratio of the current pressure to the predefined maximum pressure in the hydraulic circuit of the electro-hydraulic system. Such an embodiment provides the advantage that an improved pressure-limiting function for the electro-hydraulic system can be implemented by means of the method. It is therefore possible for damage as a result of an excessively increased pressure at the electro-hydraulic system to be reliably avoided.

In the selecting step it is also possible to select a first value of the target torque if the current pressure in the hydraulic circuit of the electro-hydraulic system is lower than a predefined maximum pressure in the hydraulic circuit of the electro-hydraulic system. It is possible to select a second value of the target torque if the current pressure in the hydraulic circuit of the electro-hydraulic system is higher than the predefined maximum pressure in the hydraulic circuit of the electro-hydraulic system. The first value of the target torque can be higher than the second value of the target torque. The first value of the target torque can represent a target torque of a larger absolute value than the first value of the target torque. The first value of the target torque can correspond to a value of a maximum available motor torque of the electric motor. The second value of the target torque can correspond to a value of a maximum pressure-limiting torque. The maximum pressure-limiting torque serves to cause the current pressure to drop below the predefined maximum pressure. If the current pressure in the hydraulic circuit of the electro-hydraulic system is higher than the predefined maximum pressure in the hydraulic circuit of the electro-hydraulic system, in the selecting step the first value of the target torque or the second value of the target torque can be selected as a function of the specific application. Such an embodiment provides the advantage that depending on the currently prevailing pressure conditions in the electro-hydraulic system a suitable value of the target torque can be selected in order to be able to determine the actuation signal for the electric motor as a function of the pressure in order to limit the pressure in the electro-hydraulic system.

In this context, a step of determining the second value of the target torque from the predefined maximum pressure in the hydraulic circuit of the electro-hydraulic system and from a current stroke of a pump, driven by the electric motor, of the electro-hydraulic system can be provided. In this way, the second value of the target torque, which corresponds to the value of the maximum pressure-limiting torque, and therefore the maximum pressure-limiting torque, are determined on the basis of the current pump data of the electro-hydraulic system. The determining step can be carried out here in real time. Therefore, the second value of the target torque, which is selected when the current pressure is higher than the predefined maximum pressure in the hydraulic circuit, can take into account the predefined maximum pressure in the hydraulic circuit and also be adapted to the current pump state. This increases the accuracy of the control of the torque of the electric motor.

In addition, the method can comprise a step of comparing the predefined maximum pressure in the hydraulic circuit of the electro-hydraulic system and the current pressure in the hydraulic circuit of the electro-hydraulic system in order to generate a comparison value. The comparison step can be carried out by means of a comparator. In the comparison step, a difference can be formed between the predefined maximum pressure and the current pressure in the hydraulic circuit of the electro-hydraulic system. The comparison value can represent this difference. The comparison value can have a positive absolute value or a negative absolute value here, or can be zero. For example, the comparison value can be positive if the current pressure is lower than the predefined maximum pressure. Such a comparison of the pressures provides the advantage that it is possible to check precisely whether or not the predefined maximum pressure is exceeded before the current pressure. This improves the avoidance of pressure in the electro-hydraulic system or in components connected thereto which exceeds the predefined maximum pressure.

In this context, the method can also comprise a step of making a threshold value decision on the basis of the comparison value in order to generate a selection value for use in the selecting step. The decision making step can be carried out by means of a threshold value decision element. If the comparison value is below a threshold value, the selection value can have a first logic level. If the comparison value is above a threshold value, the selection value can have a second logic level. The threshold value can correspond, for example, to a comparison value of zero. Depending on the logic level of the selection value, in the selecting step the first value or the second value of the target torque can be selected. For example, the selection value can have a second logic level, which can correspond to a high logic level, in the event of the comparison value being higher than zero, i.e. the current pressure is lower than the predefined maximum pressure of the hydraulic circuit. For example the first value of the target torque can then be selected in the selecting step. Such a threshold value decision provides the advantage that it is possible to determine in an uncomplicated and reliable way whether or not the current pressure exceeds the predefined maximum pressure. This increases the safety in the electro-hydraulic system further.

In particular, the determining step can be carried out by means of a closed-loop controller in which a closed-loop control curve is limited to the selected value of the target torque as a maximum value. In the determining step, the setpoint torque can be combined with the target torque. If the setpoint torque has a higher value than the target torque, in the determining step the actuation signal only takes into account the target torque. Such an embodiment provides the advantage that the actuation signal here is determined reliably and securely on the basis of a torque which does not bring about an excessively increased pressure in the electro-hydraulic system.

The selecting step can also be carried out by means of a switch which can be switched between two switched positions. The switch can be switched, for example, by means of the selection value from the threshold value decision-making step. The switch can have a first switched position and a second switched position. The first switched position of the switch can correspond, for example, to the first value of the target torque. The second switched position of the switch can correspond, for example, to the second value of the target torque. The switch can be placed, for example, in the first switched position by applying the second logic level of the selection signal from the threshold value decision-making step. Such an embodiment provides the advantage that a reliable and secure selection of a suitable value of the target torque is possible.

In addition, a step of calculating the setpoint torque on the basis of a setpoint pressure and the current pressure in the hydraulic circuit of the electro-hydraulic system and a setpoint rotational speed as well as a current rotational speed of the electric motor can be provided. It is also possible to provide a step of converting the actuation signal into a motor current for driving the electric motor. It is therefore possible for the setpoint torque to represent current ratios in the electro-hydraulic system, which permits more precise control of the torque of the electric motor.

BRIEF DESCRIPTION OF THE DRAWINGS

The disclosure will be explained in more detail below by way of example with reference to the appended drawings, in which.

DETAILED DESCRIPTION

Figure 1:
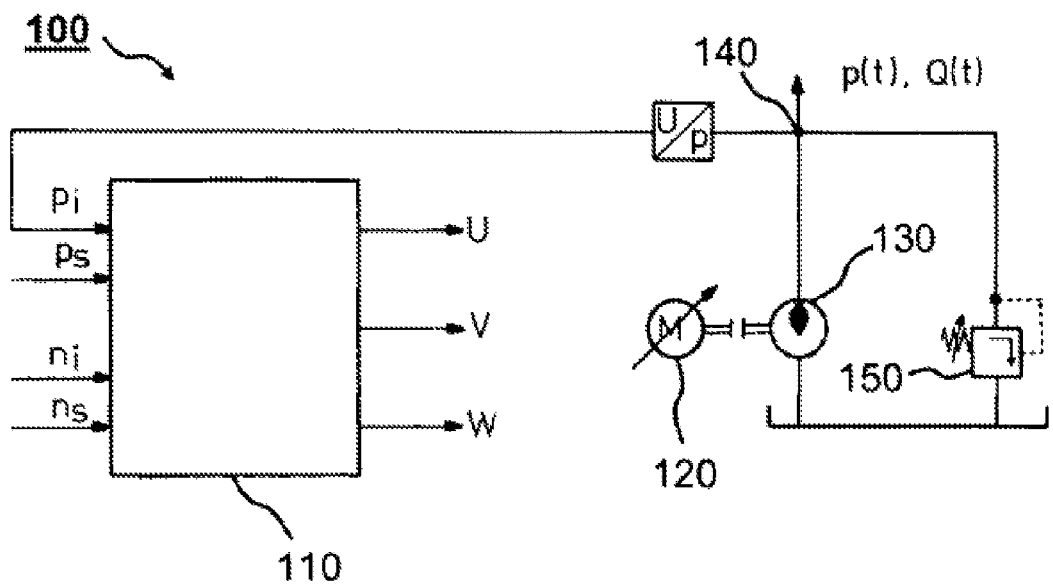
FIG. 1 shows an electro-hydraulic system.

Identical or similar elements can be provided in the following figures by means of identical or similar reference symbols. In addition, the figures in the drawings and the description thereof contain numerous features in combination. To a person skilled in the art it is clear here that these features can also be considered individually or combined to form further combinations not explicitly described here.

FIG. 1 shows an electro-hydraulic system 100 in a schematic illustration. The electro-hydraulic system 100 has an inverter 110, an electric motor 120, a pump 130, a pressure tap 140, a pressure-limiting valve 150 and a pressure/voltage converter U/p. In addition, an actual pressure $p_i$, a setpoint pressure $p_s$, an actual rotational speed $n_i$, a setpoint rotational speed $n_s$, a motor current, a motor voltage or a motor power U, V or W, a pressure profile p(t) and a mass flow profile Q(t) are shown.

The electro-hydraulic system 100 has a fluid line in which a hydraulic fluid can be circulated by the pump 130. Even if it is not explicitly illustrated in FIG. 1, the electro-hydraulic system 100 can also have more than one fluid line. The therefore at least one fluid line of the electro-hydraulic system 100 forms a hydraulic circuit of the electro-hydraulic system 100. If the hydraulic fluid is circulated in the hydraulic circuit of the electro-hydraulic system 100, the pressure profile p(t) and the mass flow profile Q(t) of the hydraulic fluid occur in the hydraulic circuit. The pressure tap 140 and the pressure-limiting valve 150 are also arranged in the hydraulic circuit of the electro-hydraulic system 100. The pressure-limiting valve 150 is configured to open when a triggering pressure is detected, in order to reduce the pressure in the hydraulic circuit of the electro-hydraulic system 100.

The inverter 110 is connected to the pressure/voltage converter U/p via a signal line. The voltage/pressure converter U/p is connected to the pressure tap 140 of the hydraulic circuit of the electro-hydraulic system 100. The voltage/pressure converter U/p is configured to convert a pressure in the hydraulic circuit of the electro-hydraulic system 100, tapped at the pressure tap 140, into a voltage. The voltage here represents the actual pressure pi in the hydraulic circuit of the electro-hydraulic system 100. The inverter 110 is configured to receive the actual pressure pi in the hydraulic circuit of the electro-hydraulic system 100 via the signal line. The inverter 110 also receives the setpoint pressure ps of the hydraulic circuit and the actual rotational speed ni as well as the setpoint rotational speed ns of the electric motor 120. The setpoint pressure ps of the hydraulic circuit, the actual rotational speed ni and the setpoint rotational speed ns can be detected by suitable apparatuses (not shown) and additionally or alternatively made available. The inverter 110 is configured to process the actual pressure pi, the setpoint pressure ps, the actual rotational speed ni and the setpoint rotational speed ns in order to generate the motor current, the motor voltage or the motor power U, V or W to drive the electric motor 120. The electric motor 120 is suitably connected to the pump 130, as is known to a person skilled in the art in the field. The electric motor 120 is configured to drive the pump 130.

Figure 2:
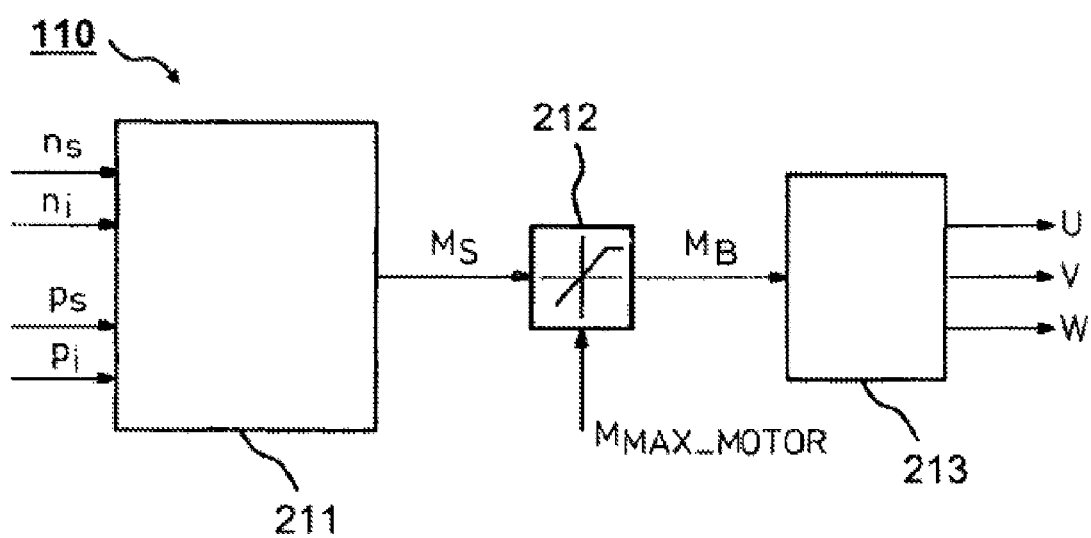
FIG. 2 shows an inverter for the electro-hydraulic system from FIG. 1.

FIG. 2 shows the inverter 110 from FIG. 1 in a detailed schematic illustration. The inverter 110 has a pressure/rotational speed closed-loop controller 211, a torque closed-loop controller 212 and a torque/current closed-loop controller 213. In addition, a setpoint torque $M_s$, an actuation signal $M_B$, a maximum motor torque $M_{MAX\_MOTOR}$, the actual pressure $p_i$, the setpoint pressure $p_s$, the actual rotational speed $n_i$, the setpoint rotational speed $n_s$ and the motor current, the motor voltage or the motor power U, V or W are shown. The pressure/rotational speed closed-loop controller 211 and the torque closed-loop controller 212 are connected to one another. The torque closed-loop controller 212 and the torque/current closed-loop controller 213 are connected to one another. The torque closed-loop controller 212 is therefore connected to the pressure/rotational speed closed-loop controller 211 and to the torque/current closed-loop controller 213 or connected between the latter.

The pressure/rotational speed closed-loop controller 211 receives the actual pressure pi, the setpoint pressure ps, the actual rotational speed ni and the setpoint rotational speed ns. The pressure/rotational speed closed-loop controller 211 is configured to process the actual pressure pi, the setpoint pressure ps, the actual rotational speed ni and the setpoint rotational speed ns in order to generate the setpoint torque Ms. The pressure/rotational speed closed-loop controller 211 outputs the setpoint torque Ms to the torque closed-loop controller 212.

The torque closed-loop controller 212 receives the setpoint torque Ms from the pressure/rotational speed closed-loop controller 211 and the maximum motor torque MMAX_MOTOR. The maximum motor torque MMAX_MOTOR can be determined or predefined in a suitable way. The torque closed-loop controller 212 is configured to process the setpoint torque Ms and the maximum motor torque MMAX_MOTOR in order to generate the actuation signal MB. The torque closed-loop controller 212 outputs the actuation signal MB to the torque/current closed-loop controller 213.

The torque/current closed-loop controller 213 receives the actuation signal MB from the torque closed-loop controller 212. The torque/current closed-loop controller 213 is configured to generate the motor current, the motor voltage or the motor power U, V or W from the actuation signal MB. The electric motor of the electro-hydraulic system in FIG. 1 can be driven by means of the motor current, the motor voltage or the motor power U, V or W.

Figure 3:
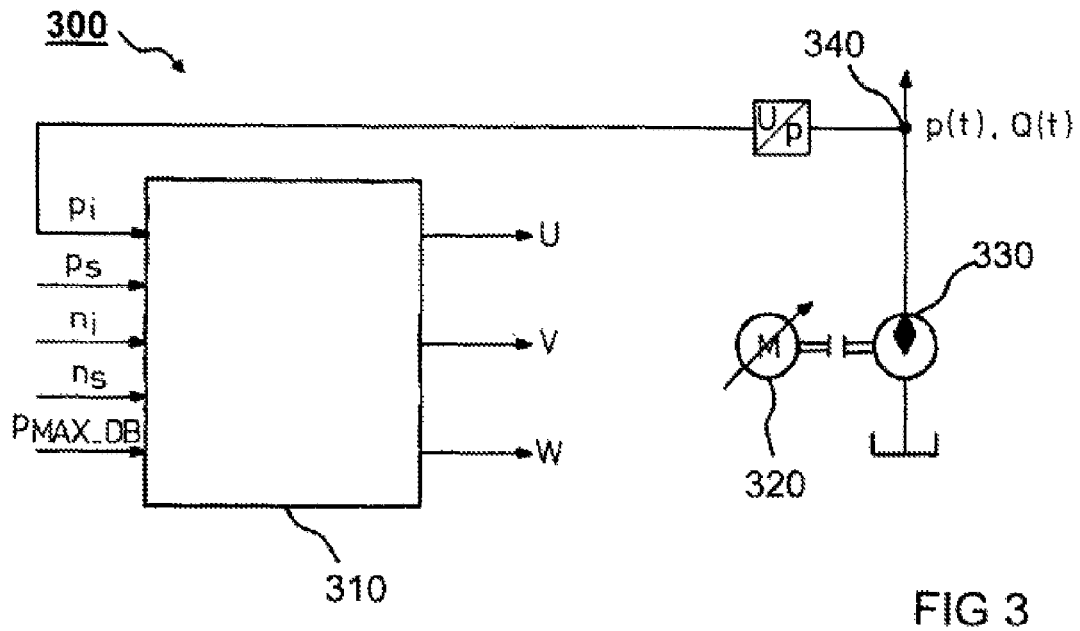
FIG. 3 shows an electro-hydraulic system according to an exemplary embodiment of the disclosure.

FIG. 3 shows an electro-hydraulic system 300 according to an exemplary embodiment of the disclosure in a schematic illustration. The electro-hydraulic system 300 is similar to the electro-hydraulic system from FIG. 1. For this reason, with respect to the electro-hydraulic system 300 in FIG. 3, mainly only differences from the electro-hydraulic system from FIG. 1 are described in more detail. The electro-hydraulic system 300 has a control device 310, an electric motor 320, a pump 330, a pressure tap 340 and a voltage/pressure converter U/p. In addition, an actual pressure $p_i$, a setpoint pressure $p_s$, an actual rotational speed $n_i$, a setpoint rotational speed $n_s$, a predefined maximum pressure $p_{max\_DB}$, a motor current U, V, W, a pressure profile p(t) and a mass flow profile Q(t) are shown. The pressure/voltage converter U/p can be a pressure meter or a pressure measuring element or pressure measuring device. The electric motor 320 can be an electric motor with an adjustable variable rotational speed, for example a synchronous motor. The pump 330 can be an adjustable pump.

The basic configuration of the electro-hydraulic system 300 in FIG. 3 corresponds to that of the electro-hydraulic system from FIG. 1 with the exception that in FIG. 3 there is no pressure-limiting valve provided and the control device 310 additionally receives the predefined maximum pressure pmax_DB. The predefined maximum pressure pmax_DB can be a pressure which is not to be exceeded in the hydraulic circuit of the electro-hydraulic system 300 for safety reasons. The predefined maximum pressure pmax_DB can be determined by a suitable apparatus and additionally or alternatively made available to the control device 310. The control device 310 can be a controller, an inverter or the like. The control device 310 is configured to process the actual pressure pi, the setpoint pressure ps, the actual rotational speed ni, the setpoint rotational speed ns and the predefined maximum pressure pmax_DB, in order to generate the motor current, the motor voltage or the motor power U, V or W. The control device 310 can be configured to receive additional data relating to the electro-hydraulic system 300, to process said data and also generate the motor current, the motor voltage or the motor power U, V or W on the basis of the additional data.

Figure 4:
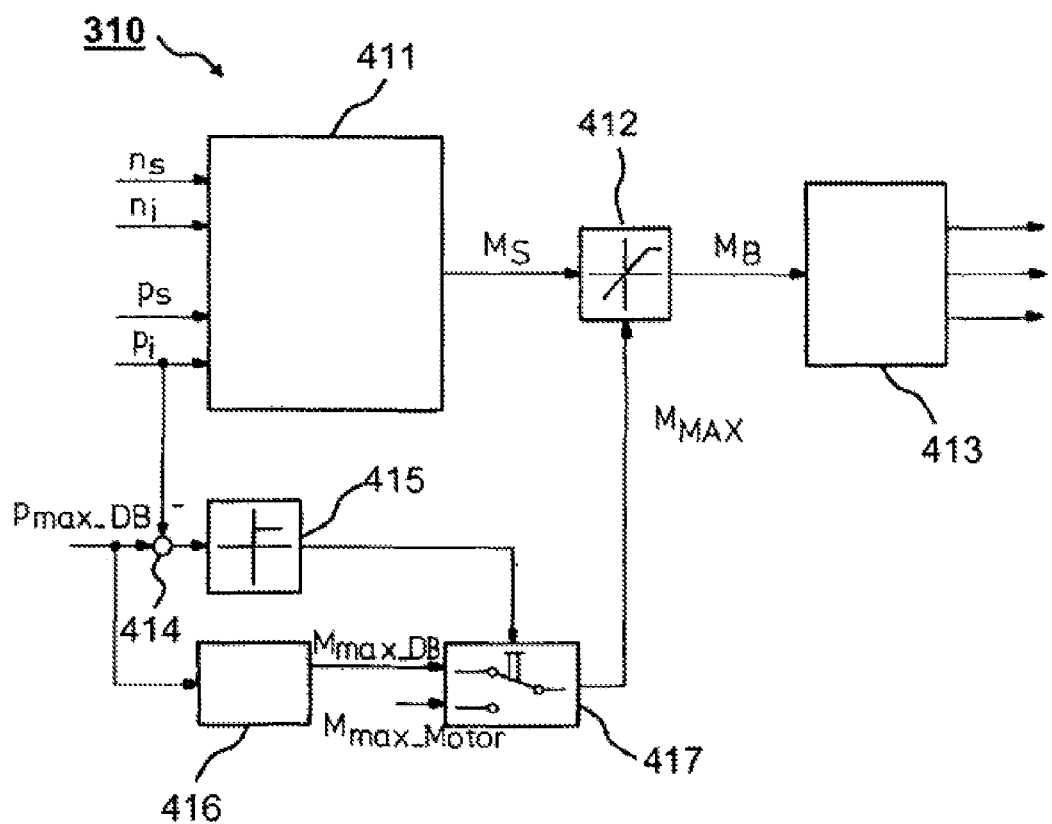
FIG. 4 shows a control device according to an exemplary embodiment of the disclosure for the electro-hydraulic system from FIG. 3.

FIG. 4 shows the control device 310 from FIG. 3 according to an exemplary embodiment of the disclosure, in a detailed schematic illustration. The control device 110 has a pressure/rotational speed closed-loop controller 411, a torque closed-loop controller 412, a torque/current closed-loop controller 413, a comparator 414, a threshold value decision element 415, a pressure-limiting torque determining device 416 and a switch 417. In addition, a setpoint torque $M_s$, an actuation signal $M_B$, a maximum motor torque $M_{MAX\_MOTOR}$, a pressure-limiting torque $M_{max\_DB}$, a target torque $M_{MAX}$, the actual pressure $p_i$, the setpoint pressure $p_s$, the actual rotational speed $n_i$, the setpoint rotational speed $n_s$, the predefined maximum pressure $p_{max\_DB}$ and the motor current, the motor voltage or the motor power U, V or W are shown.

The pressure/rotational speed closed-loop controller 411, the torque closed-loop controller 412 and the torque/current closed-loop controller 413 here can correspond partially or completely to the pressure/rotational speed closed-loop controller, the torque closed-loop controller and the torque/current closed-loop controller from FIG. 2. The pressure/rotational speed closed-loop controller 411 and the torque closed-loop controller 412 are connected to one another. The torque closed-loop controller 412 and the torque/current closed-loop controller 413 are connected to one another. The torque closed-loop controller 412 is therefore connected to the pressure/rotational speed closed-loop controller 411 and the torque/current closed-loop controller 413. The torque closed-loop controller 412 is also connected to the switch 417. The switch 417 is connected to the torque closed-loop controller 412 and to the threshold value decision element 415 as well as to the pressure-limiting torque determining device 416. The threshold value decision element 415 is connected to the switch 417 and to the comparator 414 or connected between the latter.

The pressure/rotational speed closed-loop controller 411 receives the current pressure or actual pressure pi, the setpoint pressure ps, the actual rotational speed ni, and the setpoint rotational speed ns. The pressure/rotational speed closed-loop controller 411 is configured to process the actual pressure pi, the setpoint pressure ps, the actual rotational speed ni and the setpoint rotational speed ns in order to generate the setpoint torque Ms. The pressure/rotational speed closed-loop controller 411 outputs the setpoint torque Ms to the torque closed-loop controller 412.

The comparator 414 receives the current pressure or actual pressure pi and the predefined maximum pressure pmax_DB. The comparator 414 is configured to compare the current pressure or actual pressure pi and the predefined maximum pressure pmax_DB. To be more precise, the comparator 414 is configured to form a difference between the predefined maximum pressure pmax_DB and the current pressure or actual pressure pi. In particular, the current pressure or actual pressure pi can be subtracted from the predefined maximum pressure pmax_DB. The comparator 414 outputs a comparison value to the threshold value decision element 415. The comparison value can represent the result of the comparison or the difference between the predefined maximum pressure pmax_DB and the current pressure or actual pressure pi.

The threshold value decision element 415 receives the comparison value from the comparator 414. The threshold value decision element 415 is configured to check whether the comparison value is higher, lower or equal to a threshold value. The threshold value can be stored in a permanent or variable fashion in the threshold value decision element 415. The threshold value decision element 415 outputs a selection signal to the switch 417. The selection signal has a high or a low logic level depending on the checking of the threshold value or the threshold value decision.

The pressure-limiting torque determining device 416 receives the predefined maximum pressure pmax_DB. The pressure-limiting torque determining device 416 can additionally also receive further data relating to the electro-hydraulic system from FIG. 3, even if this is not illustrated in FIG. 4. The pressure-limiting torque determining device 416 can, for example, receive the predefined maximum pressure pmax_DB and a current pump stroke of the pump of the electro-hydraulic system from FIG. 3. The pressure-limiting torque determining device 416 is configured to process the predefined maximum pressure pmax_DB and the further data relating to the electro-hydraulic system in order to determine or calculate the pressure-limiting torque MMAX_DB. The pressure-limiting torque MMAX_DB can therefore be based on current data here. The pressure-limiting torque determining device 416 outputs the pressure-limiting torque MMAX_DB to the switch 417.

The switch 417 receives the pressure-limiting torque MMAX_DB from the pressure-limiting torque determining device 416, and the maximum motor torque MMAX_MOTOR. In this context, the maximum motor torque MMAX_MOTOR can be made available to the switch 417 by a suitable apparatus. The switch 417 also receives the selection value from the threshold value decision element 415. The switch 417 can have two switched positions. The reception of the selection value via the threshold value decision element 415 causes the switch 417 to be placed in a first switched position or a second switched position. The switch 417 is placed in the first or the second switched position as a function of the logic level of the selection value. The first switched position can represent, for example, a selection of the pressure-limiting torque MMAX_DB. The second switched position can represent, for example, a selection of the maximum motor torque MMAX_MOTOR. The switch 417 is configured to output either the pressure-limiting torque MMAX_DB or the maximum motor torque MMAX_MOTOR as the target torque MMAX to the torque closed-loop controller 412 as a function of the switched position, and therefore as a function of the logic level of the selection value.

The torque closed-loop controller 412 receives the setpoint torque Ms from the pressure/rotational speed closed-loop controller 411 and the target torque MMAX from the switch 417. The torque closed-loop controller 412 is configured to process the setpoint torque Ms and the target torque MMAX in order to determine or generate the actuation signal MB. In this context, the target torque MMAX represents a pressure-dependent upper limit for the setpoint torque Ms. The torque closed-loop controller 412 outputs the actuation signal MB to the torque/current closed-loop controller 413.

The torque/current closed-loop controller 413 receives the actuation signal MB from the torque closed-loop controller 412. The torque/current closed-loop controller 413 is configured to generate the motor current, the motor voltage or the motor power U, V or W from the actuation signal MB. The motor current, the motor voltage or the motor power U, V or W can be a three-phase alternating current. The electric motor of the electro-hydraulic system in FIG. 3 can be driven by means of the motor current, the motor voltage or the motor power U, V, or W.

If the current pressure $p_i$ is lower than the predefined maximum pressure $p_{max\_DB}$, subtraction of the current pressure $p_i$ from the predefined maximum pressure $p_{max\_DB}$ in the comparator 414 supplies a comparison signal which represents a positive difference between the two pressures. The comparison signal, which represents a positive difference, is detected in the threshold value decision element 415, for example as above a threshold value. In this context, the threshold value can be, for example, zero. Therefore, the threshold value decision element 415 can output, for example, a selection signal with a high logic level to the switch 417. The switch 417 can be placed, on the basis of the selection signal with the high logic level, in a switched position in which the maximum available motor torque $M_{MAX\_MOTOR}$ is selected. The switch 417 therefore outputs the maximum available motor torque $M_{MAX\_MOTOR}$ as the target torque $M_{MAX}$. Therefore, the actuation signal $M_B$ can correspond at maximum to the maximum available motor torque $M_{MAX\_MOTOR}$.

If the current pressure $p_i$ is higher than the predefined maximum pressure $p_{max\_DB}$, subtraction of the current pressure $p_i$ from the predefined maximum pressure $p_{max\_DB}$ in the comparator 414 supplies a comparison signal which represents a negative difference between the two pressures. The comparison signal, which represents a negative difference, is detected in the threshold value decision element 415, for example as below a threshold value. In this context, the threshold value can be, for example, zero. Therefore, the threshold value decision element 415 can output, for example, a selection signal with a low logic level to the switch 417. The switch 417 can be placed, on the basis of the selection signal with the low logic level, in a switched position in which the pressure-limiting torque $M_{max\_DB}$ is selected. The switch 417 therefore outputs the pressure-limiting torque $M_{max\_DB}$ as the target torque $M_{MAX}$.

Therefore, the actuation signal $M_B$ can correspond at maximum to the pressure-limiting torque $M_{max\_DB}$.

If the current pressure $p_i$ is equal to the predefined maximum pressure $p_{max\_DB}$, subtraction of the current pressure $p_i$ from the predefined maximum pressure $p_{max\_DB}$ in the comparator 414 supplies a comparison signal which represents a difference between the two pressures of zero. The comparison signal, which represents a difference of zero, is detected in the threshold value decision element 415, for example as being equal to a threshold value if the threshold value is, for example, zero. In this case, it is possible, depending on safety regulations, for the threshold value decision element 415 to be configured in a specific application in practice to output, for example, a selection signal with a low logic level or a selection signal with a high logic level to the switch 417.

Figure 5:
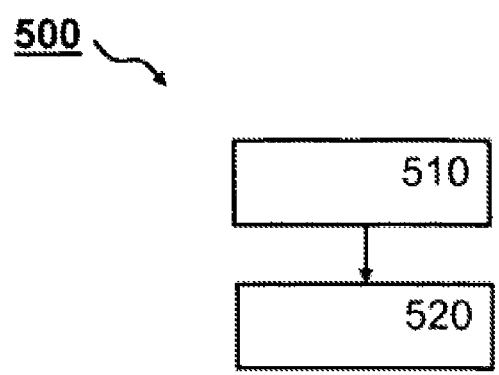
FIG. 5 shows a method according to an exemplary embodiment of the disclosure.

FIG. 5 shows a flowchart of a method 500 for controlling a torque of an electric motor of an electro-hydraulic system. The electro-hydraulic system can be the electro-hydraulic system from FIG. 3. The electric motor can be the electric motor from FIG. 3. The method 500 has a step of selecting 510 a value of a target torque as a function of a current pressure in a hydraulic circuit of the electro-hydraulic system. The method 500 also has a step of determining 520 an actuation signal for the electric motor on the basis of a setpoint torque and the target torque. The method 500 can be carried out in conjunction with an electro-hydraulic system such as that from FIG. 3 and a control device such as that from FIG. 4. In this context, the steps of the method 500 are carried out by various apparatuses of the control device from FIG. 4. The method 500 can have further steps and additionally or alternatively the steps 510 and 520 can have further component steps. In particular, the selecting step 510 can be carried out by the comparator, the threshold value decision element, the pressure-limiting torque determining device and the switch from FIG. 4. The determining step 520 can be carried out, for example, by the torque closed-loop controller.

Various exemplary embodiments of the present disclosure are explained together below with reference to FIGS. 1 to 5. Various exemplary embodiments of the present disclosure can be applied, inter alia, to hydraulic systems or electro-hydraulic systems which use constant pumps, on which p/Q(n) closed-loop control is performed by, for example, a synchronous motor, as a central drive, and in which previously a pressure-limiting valve was installed in order to protect components, but without a safety function.

According to various exemplary embodiments of the present disclosure it is possible, in the case of pump drives with a variable rotational speed and with constant pumps, to replace the pressure-limiting valve by means of a software function in a control component of the control device 310 or of the frequency inverter. Frequency inverters usually have a function of limiting to the maximum torque of the motor. This torque limitation is used according to various exemplary embodiments of the present disclosure for the pressure-limiting function. In the case of pump drives with a variable rotational speed, the torque at the motor has a static component (caused by the pressure) as well as a dynamic component (caused by acceleration). The following therefore applies: M_Motor=M_stat+M_dyn. The static component of the motor torque can be calculated as follows: M_stat=V_G_Pump*p/(2*π*η_mech_hyd). The maximum torque $M_{max\_DB}$ for the pressure-limiting function is calculated according to this formula from the response pressure of a pressure-limiting valve or the predefined maximum pressure $p_{max\_DB}$. There is also a resulting generalization for variable pumps. V_G_Pump can be calculated in real time from the current measurement of the pump stroke, for example the pivoting angle, and used for real-time calculation of the pressure-limiting torque $M_{max\_DB}$. The dynamic component of the motor torque is obtained as follows: M_dyn=J*α. In the case of low pressures, M_dyn will assume maximum values during the acceleration ($M_{MAX\_MOTOR}$), in order to ensure the shortest reaction times. The pressure is to be used only to a limited degree if the current pressure or actual pressure $p_i$ in the electro-hydraulic system 300 has reached the maximum predefined pressure $P_{max\_DB}$ ($p_i > P_{max\_DB}$) without the acceleration capability being adversely affected. The pressure-limiting torque $M_{max\_DB}$ is therefore activated only if $p_i > p_{max\_DB}$, and otherwise it is limited to the maximum motor torque $M_{MAX\_MOTOR}$.

According to various exemplary embodiments of the present disclosure, a pressure-limiting circuit can be provided for an electro-hydraulic system or an electro-hydraulic control system with an electric motor with a variable rotational speed. In the case of an electro-hydraulic control system with an electric motor which can be actuated with a variable rotational speed, a system pressure is detected electronically. If the system pressure exceeds a predefined maximum pressure, a torque limitation, which corresponds to the predefined maximum pressure, is predefined to a torque limiter of the electric motor or a controller thereof. Therefore, according to various exemplary embodiments of the present disclosure, limitation of the motor torque or of the motor current on the basis of a pressure limitation is described.

The exemplary embodiments shown are only selected by way of example and can be combined with one another.

LIST OF REFERENCE SYMBOLS

100 Electro-hydraulic system
110 Inverter
120 Electric motor
130 Pump
140 Pressure tap
150 Pressure-limiting valve
U/p Pressure/voltage converter
$p_i$ Actual pressure
$p_s$ Setpoint pressure
$n_i$ Actual rotational speed
$n_s$ Setpoint rotational speed
U,V,W Motor current, motor voltage or motor power
p(t) Pressure profile
Q(t) Mass flow profile
211 Pressure/rotational speed closed-loop controller
212 Torque closed-loop controller
213 Torque/current closed-loop controller
$M_s$ Setpoint torque
$M_B$ Actuation signal
$M_{MAX\_MOTOR}$ Maximum motor torque
300 Electro-hydraulic system
310 Control device
320 Electric motor
330 Pump
340 Pressure tap
$p_{max\_DB}$ Predefined maximum pressure
411 Pressure/rotational speed closed-loop controller
412 Torque closed-loop controller
413 Torque/current closed-loop controller
414 Comparator
415 Threshold value decision element
416 Pressure-limiting torque determining device
417 Switch
$M_{max\_DB}$ Pressure-limiting torque
$M_{MAX}$ Target torque
500 Method
510 Selecting step
520 Determining step

The invention claimed is:

1. A method for controlling a torque of an electric motor of an electro-hydraulic system, the method comprising:
   selecting, using a processor, a value of a target torque as a function of a current pressure and a predefined maximum pressure in a hydraulic circuit of the electro-hydraulic system, wherein a first value of the target torque is selected if the current pressure is lower than the predefined maximum pressure and a second value of the target torque is selected if the current pressure is higher than the predefined maximum pressure;
   calculating the setpoint torque based on the current pressure in the hydraulic circuit of the electro-hydraulic system, and
   determining, using the processor, an actuation signal to control the torque of the electric motor based on a setpoint torque and the target torque,
   wherein the actuation signal is determined by a closed-loop controller, in which a closed-loop control curve is limited to the selected value of the target torque as a maximum value.

2. The method as claimed in claim 1, wherein:
   the value of the target torque is selected as a function of a predefined maximum pressure in the hydraulic circuit of the electro-hydraulic system and the current pressure in the hydraulic circuit of the electro-hydraulic system.

3. The method as claimed in claim 2, wherein the second value of the target torque is determined from the predefined maximum pressure in the hydraulic circuit of the electro-hydraulic system and from a pump stroke of a pump driven by the electric motor of the electro-hydraulic system.

4. The method as claimed in claim 2, further comprising:
   comparing the predefined maximum pressure in the hydraulic circuit of the electro-hydraulic system and the current pressure in the hydraulic circuit of the electro-hydraulic system to generate a comparison value.

5. The method as claimed in claim 4, further comprising:
   making a threshold value decision based on the comparison value to generate a selection value for use in selecting the value of the target torque.

6. The method as claimed in claim 1, wherein the value of the target torque is selected by a switch configured to be switched between two switched positions.

7. The method as claimed in claim 1, further comprising:
   performing at least one of the following:
   (i) further calculating the setpoint torque based on at least one of: a setpoint rotational speed and a current rotational speed of the electric motor; and
   (ii) converting the actuation signal into a motor current to drive the electric motor.

8. A device for controlling a torque of an electric motor of an electro-hydraulic system, the device comprising:

a first apparatus configured to select, using a processor, a value of a target torque as a function of a current pressure and a predefined maximum pressure in a hydraulic circuit of the electro-hydraulic system, wherein a first value of the target torque is selected if the current pressure is lower than the predefined maximum pressure and a second value of the target torque is selected if the current pressure is higher than the predefined maximum pressure; and a second apparatus configured to determine an actuation signal, using the processor, to control the torque of the electric motor based on a setpoint torque and the target torque, wherein the setpoint torque is calculated based on the current pressure, and wherein the actuation signal is determined by a closed-loop controller, in which a closed-loop control curve is limited to the selected value of the target torque as a maximum value.

9. A method for controlling a torque of an electric motor of an electro-hydraulic system, the method comprising:

selecting, using a processor, a value of a target torque as a function of a current pressure and a predefined maximum pressure in a hydraulic circuit of the electro-hydraulic system, wherein a first value of the target torque is selected if the current pressure is lower than the predefined maximum pressure and a second value of the target torque is selected if the current pressure is higher than the predefined maximum pressure; and determining, using the processor, an actuation signal to control the torque of the electric motor based on a setpoint torque and the target torque, wherein the actuation signal is determined by a closed-loop controller, in which a closed-loop control curve is limited to the selected value of the target torque as a maximum value, and wherein the closed-loop controller receives the setpoint torque and the selected value of the target torque as inputs.

10. The method as claimed in claim 9, wherein:

the value of the target torque is selected as a function of a predefined maximum pressure in the hydraulic circuit of the electro-hydraulic system and the current pressure in the hydraulic circuit of the electro-hydraulic system.

11. The method as claimed in claim 10, wherein the second value of the target torque is determined from the predefined maximum pressure in the hydraulic circuit of the electro-hydraulic system and from a pump stroke of a pump driven by the electric motor of the electro-hydraulic system.

12. The method as claimed in claim 10, further comprising:

comparing the predefined maximum pressure in the hydraulic circuit of the electro-hydraulic system and the current pressure in the hydraulic circuit of the electro-hydraulic system to generate a comparison value.

13. The method as claimed in claim 12, further comprising:

making a threshold value decision based on the comparison value to generate a selection value for use in selecting the value of the target torque.

14. The method as claimed in claim 9, wherein the setpoint torque is calculated based on the current pressure in the hydraulic circuit of the electro-hydraulic system.

* * * * *